Sept. 22, 1931.  E. W. ORTON  1,824,168
BUTTERFLY VALVE
Filed Feb. 18, 1929  2 Sheets-Sheet 1
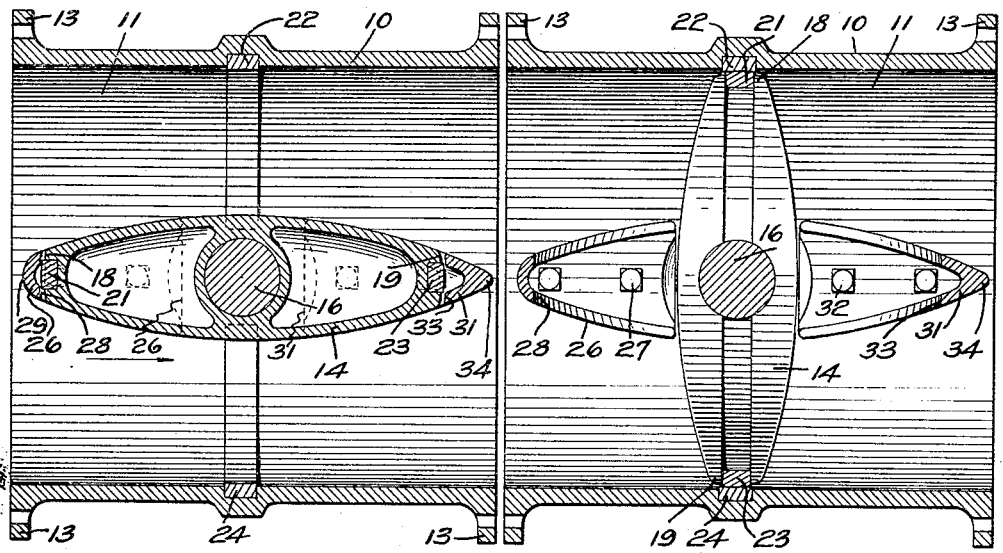
INVENTOR:
Ernest W. Orton
BY
White, Prost Fryer
ATTORNEYS.

Sept. 22, 1931.  E. W. ORTON  1,824,168
BUTTERFLY VALVE
Filed Feb. 18, 1929  2 Sheets-Sheet 2

INVENTOR:
Ernest W. Orton
BY White, Prost & Fryer
ATTORNEYS.

Patented Sept. 22, 1931

1,824,168

UNITED STATES PATENT OFFICE

ERNEST W. ORTON, OF MOUNTAIN VIEW, CALIFORNIA, ASSIGNOR TO THE PELTON WATER WHEEL COMPANY, OF SAN FRANCISCO, CALIFORNIA, A CORPORATION OF CALIFORNIA

BUTTERFLY VALVE

Application filed February 18, 1929. Serial No. 340,786.

This invention relates generally to valves of the butterfly type, which are employed for controlling the flow of various fluids.

Valves of the butterfly type generally utilize a body member having a passage for flow of fluid, together with a butterfly member movable from open to closed position. Generally the butterfly member is substantially a disc which extends laterally across and obstructs the passage when in closed position, and which extends intermediate the passage along the direction of flow of fluid, when in open position. When valves of this character which have previously been employed are in open or partially open position, considerable frictional and eddy current losses occur due to the character of the surface contour presented by the butterfly member to the fluid. Furthermore the edges of the butterfly member are frequently eroded or worn away in use, to such an extent that they do not properly seat when the valve is closed.

It is a general object of this invention to devise a butterfly valve having a relatively high flow efficiency, and in which losses due to friction between the fluid and the butterfly member due to eddy currents, are reduced to a minimum.

It is a further object of this invention to devise means for protecting one or more of the edges of a butterfly member, when a valve of this character is in open position.

It is a further object of this invention to devise means for reducing the hydraulic friction losses resulting from flow past the butterfly member of a valve of the above character, whereby normal flow conditions through the valve body are greatly improved.

Further objects of the invention will appear from the following description in which I have set forth the preferred embodiment of my invention. It is to be understood that the appended claims are to be accorded a range of equivalents consistent with the state of the prior art.

Referring to the drawings:

Figure 1 is a side elevational view in cross section, illustrating a butterfly valve incorporating my invention.

Fig. 2 is a view similar to Fig. 1, but showing the valve in closed rather than open position.

Fig. 6 is a view similar to Fig. 3, but showing a modified construction of the valve.

Figure 3:
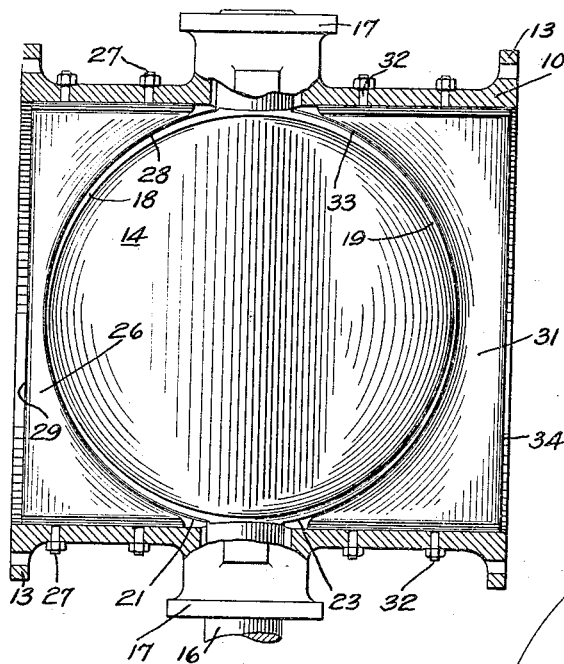
Fig. 3 is a plan view of the valve as shown in Figs. 1 and 2, the valve casing or body being shown in cross section.
Figure 4:
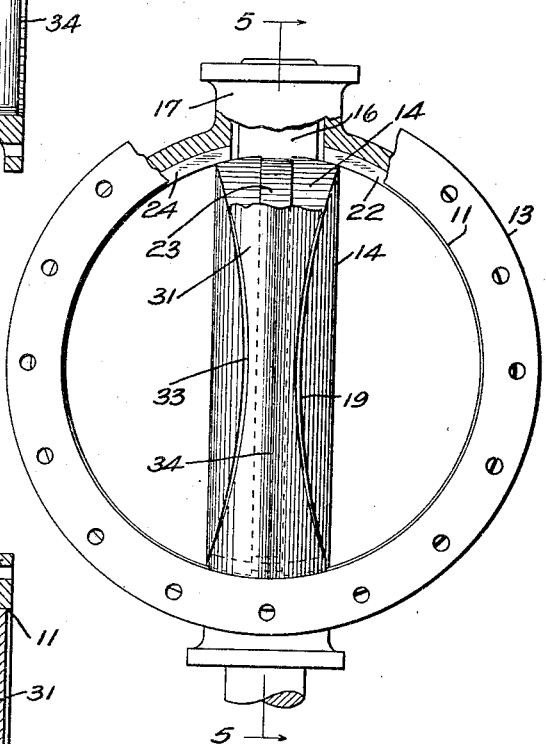
Fig. 4 is an end view of the valve as shown in Fig. 1, the butterfly member being in open position.
Figure 5:
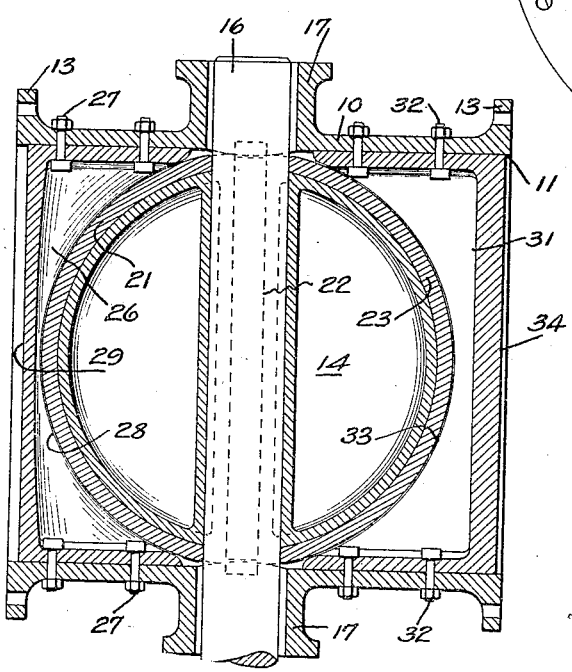
Fig. 5 is a cross sectional view taken along the line 5—5 of Fig. 4.

A detail description of the invention as illustrated in the drawings is as follows: Referring to Figs. 1 to 5 inclusive, I have shown a conventional form of valve body 10 having a passage 11 for flow of fluid. The usual flanges 13 have been shown upon the ends of the valve body 10, for making connection with fluid conduits. For convenience the left hand portion of the passage as shown in Figs. 1 and 2, is presumed to be the inflow or upstream side of the valve, while the right hand portion forms the outflow or down stream side.

Mounted within the valve body 10 so as to control flow of fluid through passage 11, there is a butterfly member 14. In order to provide for controlling movements, this member has been shown with its intermediate portion mounted upon a suitable shaft 16, and this shaft is journaled in suitable bearings 17. The outline of butterfly member 14 in plan is shown in Fig. 3 and can be variously shaped, although I prefer that it be practically circular or disc-like. When the valve is in open position, the butterfly member 14 has one edge indicated at 18 which is advanced toward the flow of fluid, and may therefore be termed the "leading edge", while the other edge indicated at 19 may be termed the "trailing edge". When the valve is in closed position, these edges cooperate with suitable seating surfaces carried by the valve body. For example I have shown the leading edge 18 provided with a suitable insert 21 of metal or other suitable material, which is adapted to seat upon a similar ring portion 22 carried by the body 10. Likewise the trailing edge 19 is provided with an insert adapted to seat upon a ring portion 24.

In combination with the structure described above, I provide means cooperating with at least the leading edge 18, and preferably cooperating with both edges 18 and 19, when the valve is in open position. Thus cooperating with the leading edge 18 I have shown a strut or vane 26 which is stationary with respect to the valve body, and which extends in the general direction of the shaft 16. As suitable means for retaining this strut in proper position, I have shown bolts 27 which serve to secure it to opposite sides of the valve body. Viewing this strut in plan as shown in Fig. 3, it is provided with one edge 28 which follows substantially the contour of the leading edge 18 of the butterfly member 14, and has another edge 29 which is presented to the flow of fluid. Sufficient clearance is provided between strut 26 and the butterfly member 14 to permit movement of this member to a position in which the leading edge 18 is directly behind the strut 26, as shown in Fig. 1.

For cooperating with the trailing edge 19 of the butterfly member, I preferably provide a strut 31 which also extends in the general direction of shaft 16, and is secured to opposite sides of the valve body by suitable means such as bolts 32. As viewed in Fig. 3, strut 31 is provided with an edge 33 following generally the contour of trailing edge 19, and also presents an edge 34 toward the outflow or down stream side of the valve.

In order to make possible relatively high flow efficiency through the valve, I preferably stream-line the surfaces of both the struts 26 and 31, and the butterfly member 14. The principles governing stream-lining of bodies to minimize surface frictional losses of fluids flowing by the same, and to minimize losses due to eddy currents in the fluid, are well known. It is believed sufficient to note that stream-lined bodies present curved surfaces, that they are tapered toward their leading and trailing edges, and that the leading portion is generally relatively blunter than the trailing portion. Thus strut 26 presents curved surfaces and is thickened toward the shaft 16. The sides of butterfly member 14 are likewise curved, and this member has its intermediate portion thickened as shown in Fig. 1. The outer surfaces of strut 31 are curved and this strut is tapered toward the edge 34. When the butterfly member 14 is in open position as shown in Fig. 1, the surfaces of struts 26 and 31 continue the stream line continuity of the sides of butterfly member 14, so that the struts together with member 14 form in effect a stream line body.

While the stream lining of certain parts of my valve for increasing the flow efficiency is a valuable feature of my invention, it is also to be noted that the strut 26 protects the leading edge 18 and the seating surface of insert 21, when the valve is in open position. Thus in my valve the edges of the butterfly member are not subject to wear or erosion and are maintained in such condition that they can always effectively seal when the valve is closed. Strut 31 likewise protects the trailing edge 19, although this edge is generally not subject to such severe wear or erosion as the leading edge 18. It is also characteristic of my invention that the head losses caused by fluid flow past opposite sides of the butterfly member 14, are substantially reduced when the valve is open. This reduction of head losses not only makes for better normal flow conditions through the valve, but tends to a certain extent to maintain the butterfly member alined with respect to the struts 26 and 31.

In Fig. 6 I have shown a modification of the invention in which the valve body 100 is shorter than the width of the butterfly member 14. Flanges 113 carried by the body member are shown connected to complementary flanges of conduits 36 and 37. Instead of securing the struts 26 and 31 to the valve body 100, these struts are secured to opposite sides of conduits 36 and 37, by suitable means such as bolts 38 and 39 respectively.

It is apparent that features of my invention are applicable to valves employed for a variety of purposes. By "fluid" as this term is employed in the specification and claims I have reference to liquids, gases, vapors or fluid mixtures.

I claim:

1. A valve comprising a body member having a passage for flow of fluid, a butterfly member movably connected to said body and disposed within said body, said butterfly member having a closed position and an open position in which it extends intermediate said passage and along the direction of flow, and means for directing flow of fluid past an edge of said member, when the same is in open position.

2. A valve comprising a body member having a passage for flow of fluid, a butterfly member movable to open and closed positions within said passage, said member when in open position extending in the general direction of flow and presenting leading and trailing edges, and means arranged to direct flow past said leading edge when said member is in open position.

3. A valve comprising a body member having a passage for flow of fluid, a butterfly member movable to open and closed positions within said passage, said member when in open position extending in the general direction of flow and presenting leading and trailing edges, and means arranged to direct flow past said trailing edge when said member is in open position.

4. A valve comprising a body member having a passage for flow of fluid, a butterfly member movable to open and closed positions within said passage, said member when in open position extending in the general direction of flow and presenting leading and trailing edges, and means arranged to direct flow past said edges when said member is in open position.

5. A valve comprising a body member having a passage for flow of fluid, a butterfly valve member movable to an open position in which it occupies an intermediate portion of the passage and to a closed position in which it obstructs the passage, and a strut arranged to extend along and direct flow past one edge of said butterfly valve when the same is in open position.

6. A valve comprising a body member having a pasage for flow of fluid, a butterfly valve member movable to an open position in which it occupies an intermediate portion of the passage and to a closed positon in which it obstructs the passage, and a strut arranged to extend along and direct flow past one edge of said butterfly valve when the same is in open position, said strut being stationary with respect to said body.

7. A valve comprising a body member having a passage for flow of fluid, a butterfly valve member movable to an open position in which it occupies an intermediate portion of the passage and to a closed position in which it obstructs the passage, and a pair of struts positioned intermediate said passage, said butterfly valve when in open position extending between said struts, the edges of said valve being substantially protected by said struts when in open position.

8. A valve comprising a body having a passage extending thru the same for flow of fluid, a pair of struts arranged at spaced points along said passage in the direction of flow, a butterfly member movable from a closed position to an open position, said member in open position extending along said passage between said struts.

9. A valve comprising a body having a passage extending thru the same for flow of fluid, a pair of struts arranged at spaced points along said passage in the direction of flow, a butterfly member movable from a closed position to an open position, said member in open position extending along said passage between said struts, said struts presenting curved surfaces to direct flow part and substantially out of contact with the edges of said member.

10. A valve comprising a body having a passage extending thru the same for flow of fluid, a pair of struts arranged at spaced points along said passage in the direction of flow, a butterfly member movable from a closed position to an open position, said member when in open position having a leading edge lying immediately behind one strut and a trailing edge lying immediately in front of the other strut, said struts and said member shaped to present a streamlined surface as a whole.

11. A valve comprising a body member having a passage for flow of fluid, a butterfly member disposed within said passage and movable between open and closed positions, said member presenting both stream lined and unstream lined surfaces to fluid flow during movement between said positions, and means for effecting stream lining adjacent the unstream lined surface of the member when in open position.

12. A valve comprising a body member having a passage for flow of fluid, a butterfly member having a seat portion and movably disposed within said passage, said member being movable between a closed position in which said member cooperates with a seat portion on the body member to close the passage and an open position in which said member presents the seat portion to fluid flow, and means for directing fluid flow past said seat portion and out of contact therewith.

13. A valve comprising a body member having a passage for flow of fluid, a butterfly member movably disposed within said passage for flow of fluid, said member being movable to open and closed positions, and means for automatically changing the character of the surface presented to the fluid flow as said member is moved from closed to open position.

14. A valve comprising a body member having a passage for flow of fluid, a butterfly member movably disposed within said passage for flow of fluid and having a stream lined and an unstream lined portion, said member being movable to open and closed positions, and means for automatically effecting stream-lining adjacent the unstreamed lined portion of said member when said member is in its open position.

In testimony whereof, I have hereunto set my hand.

ERNEST W. ORTON.